US012671971B2

(12) United States Patent
Hong

(10) Patent No.: US 12,671,971 B2
(45) Date of Patent: Jun. 30, 2026

(54) METHOD FOR TRANSMITTING CAPABILITY INFORMATION INDICATING SUPPORT FOR MINT SERVICE, AND USER EQUIPMENT THEREFOR

(71) Applicant: H3NITY Co., Ltd., Yongin-si (KR)

(72) Inventor: Hyo Jin Hong, Seoul (KR)

(73) Assignee: H3NITY Co., Ltd., Yongin-si (KR)

( * ) Notice: Subject to any disclaimer, the term of this patent is extended or adjusted under 35 U.S.C. 154(b) by 0 days.

(21) Appl. No.: 19/459,279

(22) Filed: Jan. 26, 2026

(65) Prior Publication Data

US 2026/0156445 A1 Jun. 4, 2026

(30) Foreign Application Priority Data

Sep. 8, 2025 (KR) ........................ 10-2025-0127091
Dec. 31, 2025 (KR) ........................ 10-2025-0217029

(51) Int. Cl.
| | |
|---|---|
| *H04W 4/90* | (2018.01) |
| *H04W 24/04* | (2009.01) |
| *H04W 48/18* | (2009.01) |
| *H04W 60/06* | (2009.01) |
| *H04W 84/04* | (2009.01) |

(52) U.S. Cl.
CPC ............. *H04W 4/90* (2018.02); *H04W 24/04* (2013.01); *H04W 48/18* (2013.01); *H04W 60/06* (2013.01); *H04W 84/042* (2013.01)

(58) Field of Classification Search
CPC ....... H04W 24/04; H04W 4/90; H04W 48/18; H04W 60/06
See application file for complete search history.

(56) References Cited

U.S. PATENT DOCUMENTS

| | | | | |
|---|---|---|---|---|
| 2024/0007878 A1* | 1/2024 | Starsinic | ................. | H04W 4/06 |
| 2024/0080791 A1* | 3/2024 | Aghili | ................... | H04W 60/04 |
| 2024/0121589 A1* | 4/2024 | Chiba | ................... | H04W 60/04 |
| 2025/0203335 A1* | 6/2025 | Vijaya Kumar | ...... | H04W 48/18 |

* cited by examiner

*Primary Examiner* — Congvan Tran
(74) *Attorney, Agent, or Firm* — Bridgeway IP Law Group, PLLC; Jihun Kim

(57) ABSTRACT

According to one embodiment of this specification, there is provided an operation method of user equipment (UE). The method may comprise: transmitting capability information indicating a support of a minimization of service interruption (MINT)—evolved packet system (EPS); upon selecting a public land mobile network (PLMN), determining whether the UE has a stored disaster roaming wait range; if the UE has the stored disaster roaming wait range, generating a random number within the disaster roaming wait range; starting a first timer based on the generated random number.

15 Claims, 11 Drawing Sheets

METHOD FOR TRANSMITTING CAPABILITY INFORMATION INDICATING SUPPORT FOR MINT SERVICE, AND USER EQUIPMENT THEREFOR

CROSS-REFERENCE TO RELATED APPLICATIONS

This application claims the priority of Korean Patent Applications No. 10-2025-0127091 filed on Sep. 8, 2025 and No. 10-2025-0217029 filed on Dec. 31, 2025, in the Korean Intellectual Property Office, the disclosure of which is incorporated herein by reference.

BACKGROUND OF THE DISCLOSURE

Field of the Disclosure

The present specification relates to a 3GPP wireless communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |

TABLE 1-continued

| REFERENCE POINT | DESCRIPTION |
|---|---|
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2*a* and S2*b* correspond to non-3GPP interfaces. S2*a* is a reference point providing the user plane with related control and mobility support between a PDN GW and a reliable non-3GPP access. S2*b* is a reference point providing the user plane with mobility support and related control between a PDN GW and an ePDG.

SUMMARY OF THE DISCLOSURE

The disclosure of this specification aims to provide a method for effectively providing a minimization of service interruption (MINT) service.

According to one embodiment of this specification, there is provided an operation method of user equipment (UE). The method may comprise: transmitting capability information indicating a support of a minimization of service interruption (MINT)—evolved packet system (EPS); upon selecting a public land mobile network (PLMN), determining whether the UE has a stored disaster roaming wait range; if the UE has the stored disaster roaming wait range, generating a random number within the disaster roaming wait range; starting a first timer based on the generated random number. While the first timer is running, the UE may not initiate an attach procedure on a selected PLMN except if the UE needs to request a packet data network (PDN) connection for emergency bearer services. The method may further comprise: if UE supporting the MINT-EPS is attached for disaster roaming services in EPS and if a de-registration procedure is triggered due to a disaster condition no longer being applicable in a current location of the UE, receiving a detach request message including a cause value set to "roaming not allowed in this tracking area" and a disaster return wait range.

According to one embodiment of this specification, there is also provided a user equipment (UE). The UE may comprise: at least one processor; and at least one computer memory operably connectable to the at least one processor and storing instructions that, when executed by the at least one processor, perform operations comprising: transmitting capability information indicating a support of a minimization of service interruption (MINT)-evolved packet system (EPS); upon selecting a public land mobile network (PLMN), determining whether the UE has a stored disaster roaming wait range; if the UE has the stored disaster roaming wait range, generating a random number within the disaster roaming wait range; starting a first timer based on the generated random number. While the first timer is running, the UE may not initiate an attach procedure on a selected PLMN except if the UE needs to request a packet data network (PDN) connection for emergency bearer services. The operations may further comprise: if UE supporting the MINT-EPS is attached for disaster roaming services in EPS and if a de-registration procedure is triggered due to a disaster condition no longer being applicable in a current location of the UE, receiving a detach request message including a cause value set to "roaming not allowed in this tracking area" and a disaster return wait range.

According to one embodiment of this specification, there is also provided a semiconductor chipset. The semiconductor chipset may comprise: at least one processor; and at least one memory capable of storing instructions and being connected electrically to the at least one processor operably. Operations, performed when the instructions are executed by the at least one processor, may comprise: transmitting capability information indicating a support of a minimization of service interruption (MINT)—evolved packet system (EPS); upon selecting a public land mobile network (PLMN), determining whether the UE has a stored disaster roaming wait range; if the UE has the stored disaster roaming wait range, generating a random number within the disaster roaming wait range; starting a first timer based on the generated random number. While the first timer is running, the UE may not initiate an attach procedure on a selected PLMN except if the UE needs to request a packet data network (PDN) connection for emergency bearer services. The operations may further comprise: if UE supporting the MINT-EPS is attached for disaster roaming services in EPS and if a de-registration procedure is triggered due to a disaster condition no longer being applicable in a current location of the UE, receiving a detach request message including a cause value set to "roaming not allowed in this tracking area" and a disaster return wait range.

According to one embodiment of this specification, there is also provided a non-volatile computer-readable storage medium recording instructions for a user equipment (UE). The instructions, when executed by one or more processors, instruct the one or more processors to perform operations comprising: transmitting capability information indicating a support of a minimization of service interruption (MINT)—evolved packet system (EPS); upon selecting a public land mobile network (PLMN), determining whether the UE has a stored disaster roaming wait range; if the UE has the stored disaster roaming wait range, generating a random number within the disaster roaming wait range; starting a first timer based on the generated random number. While the first timer is running, the UE may not initiate an attach procedure on a selected PLMN except if the UE needs to request a packet data network (PDN) connection for emergency bearer services. The operations may further comprise: if UE supporting the MINT-EPS is attached for disaster roaming services in EPS and if a de-registration procedure is triggered due to a disaster condition no longer being applicable in a current location of the UE, receiving a detach request message including a cause value set to "roaming not allowed in this tracking area" and a disaster return wait range.

According to the disclosure of this specification, there is provided provide a method for effectively providing the MINT service.

According to the disclosure of the present specification, signaling congestion that may occur when a plurality of terminals simultaneously perform disaster roaming attachment/update/service requests in a disaster situation can be distributed, and unnecessary retries and mobility procedures can be reduced, thereby minimizing service interruption.

In addition, by controlling a return procedure at the time when the disaster ends based on a waiting range and a transition permission flag, it is possible to shorten a return time to normal service while alleviating network congestion.

DESCRIPTION OF EXEMPLARY EMBODIMENTS

Figure 1:
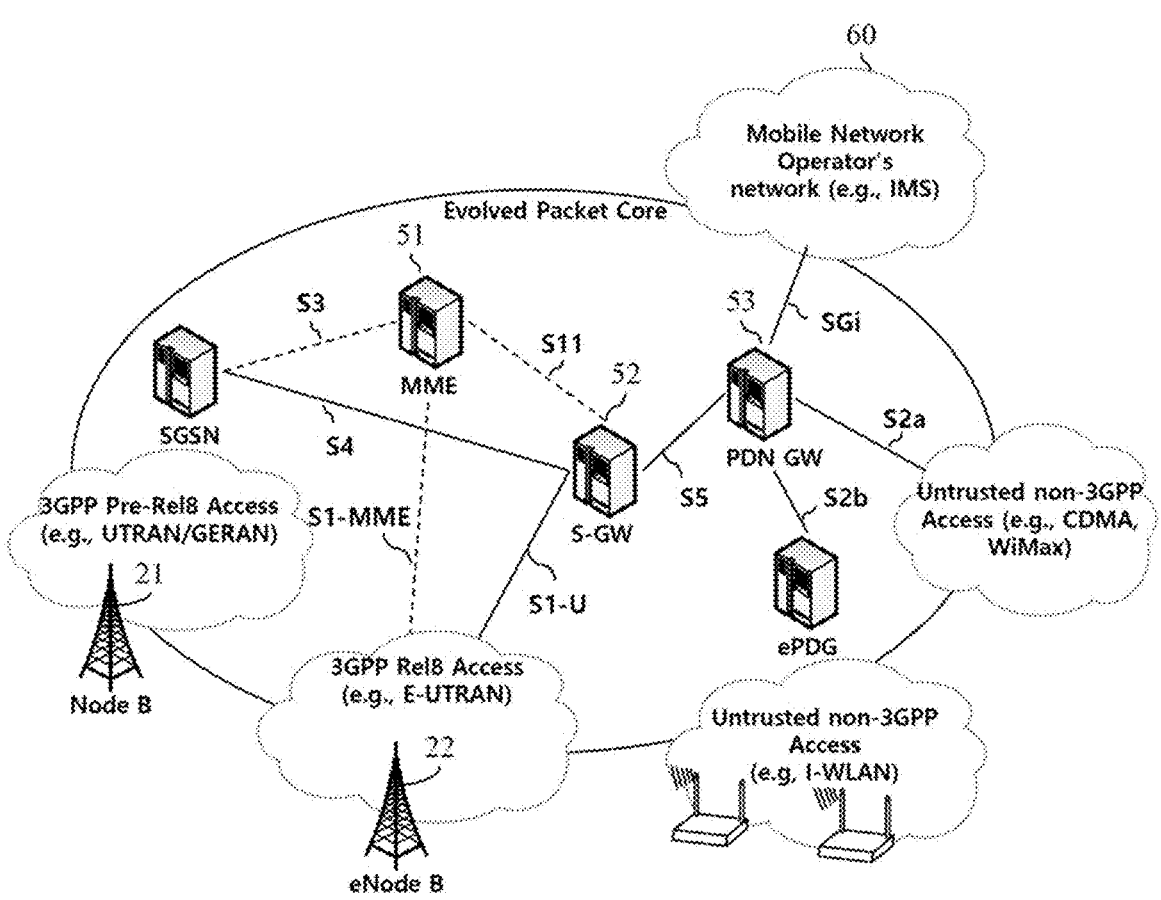
FIG. 1 is a view illustrating the structure of an evolved mobile communication network.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS EPS: stands for Evolved Packet System and means a mobile communication system including a UE, an access network including LTE, and an EPC PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e) NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality Hereinafter, the present disclosure is described with reference to the accompanying drawings.

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

Figure 2:
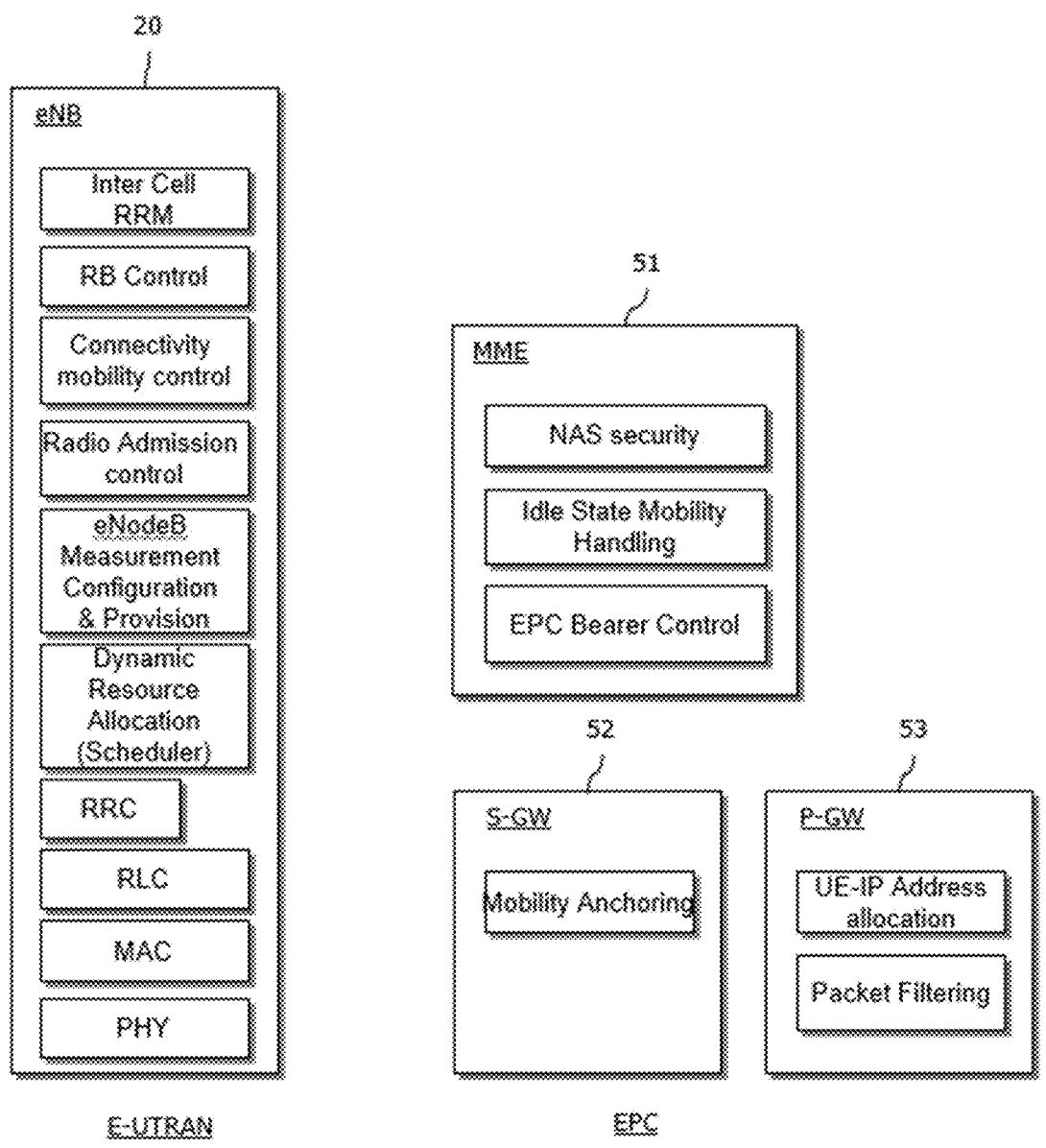
FIG. 2 is an exemplary view illustrating functions of main nodes of a common E-UTRAN and a common EPC.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

Figure 3:
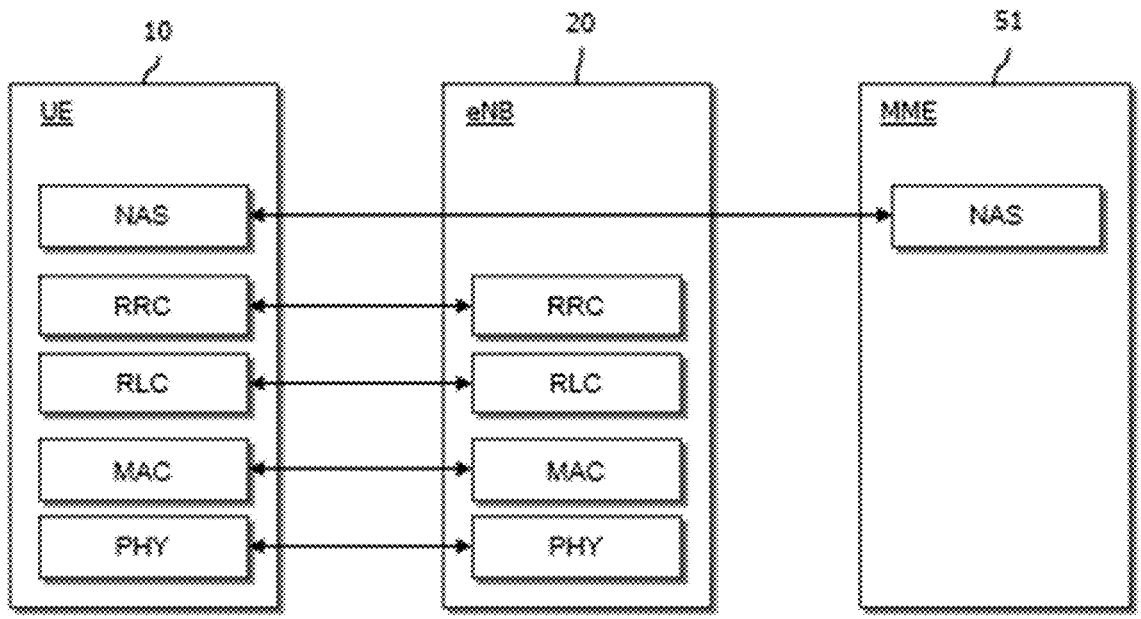
FIG. 3 is an exemplary view illustrating the structure of a radio interface protocol in a control plane between a UE and an eNodeB.
Figure 4:
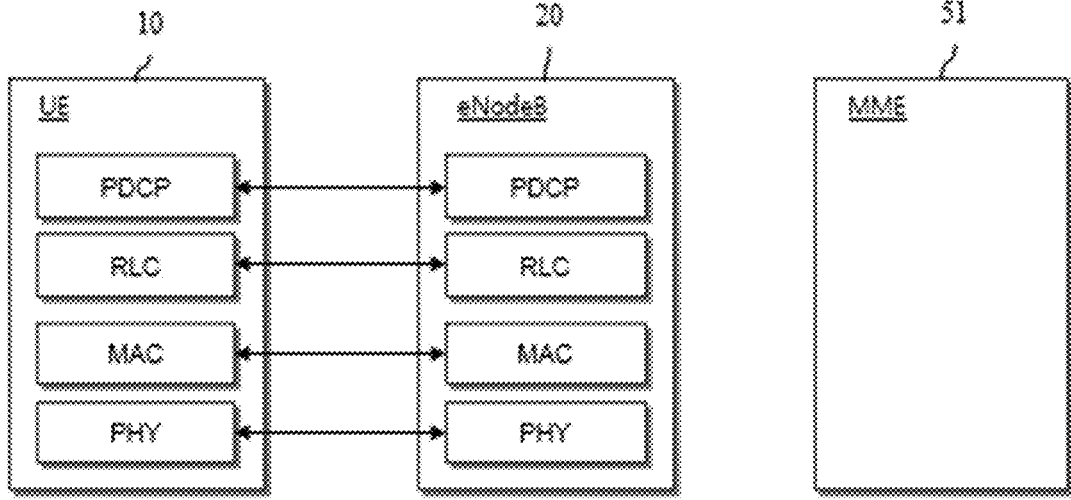
FIG. 4 is another exemplary view illustrating the structure of a radio interface protocol in a user plane between a UE and a base station.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VOIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VOIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CON-NECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be pro-vided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The mul-tiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Figure 5:
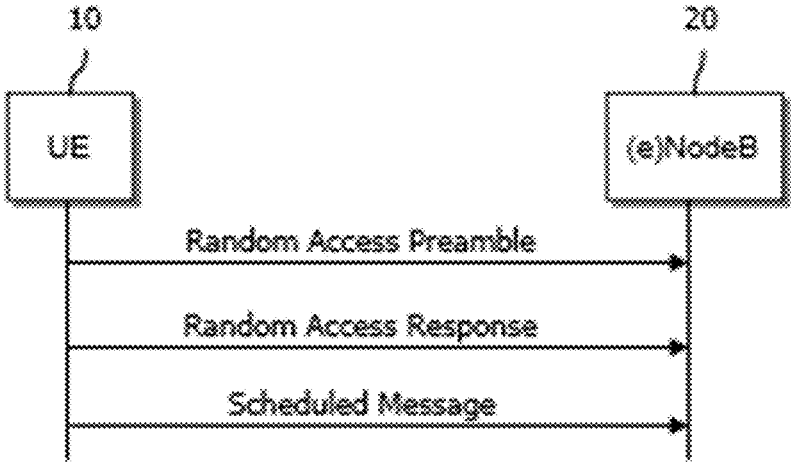
FIG. 5 is a flowchart illustrating a random access procedure in 3GPP LTE.

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNo-deB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH con-figuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

Figure 6:
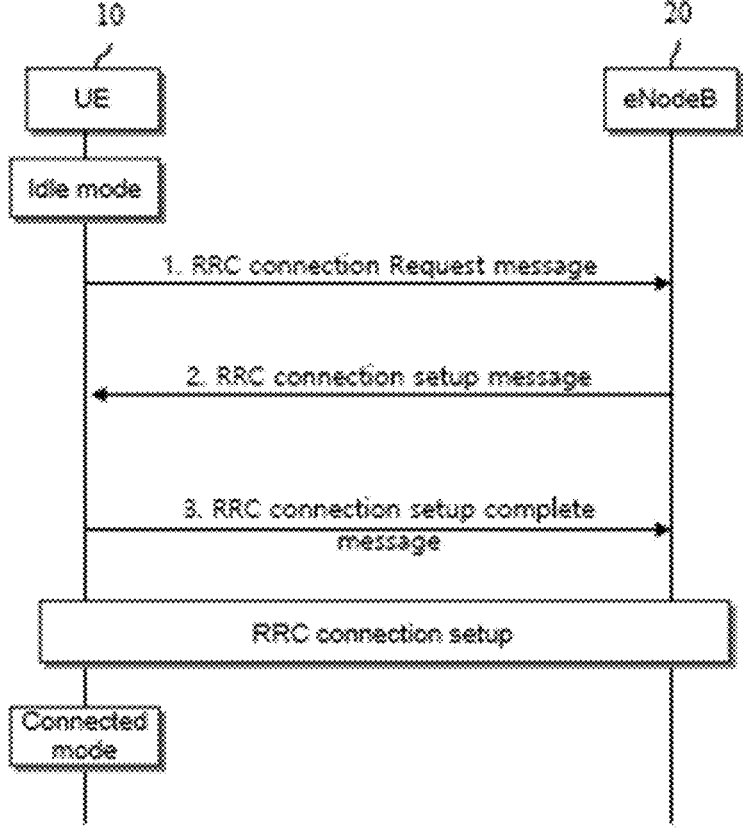
FIG. 6 illustrates a connection process in a radio resource control (RRC) layer.

FIG. 6 illustrates a connection process in a radio resource control (RRC) layer.

FIG. 6 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection proce-dure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Figure 7:
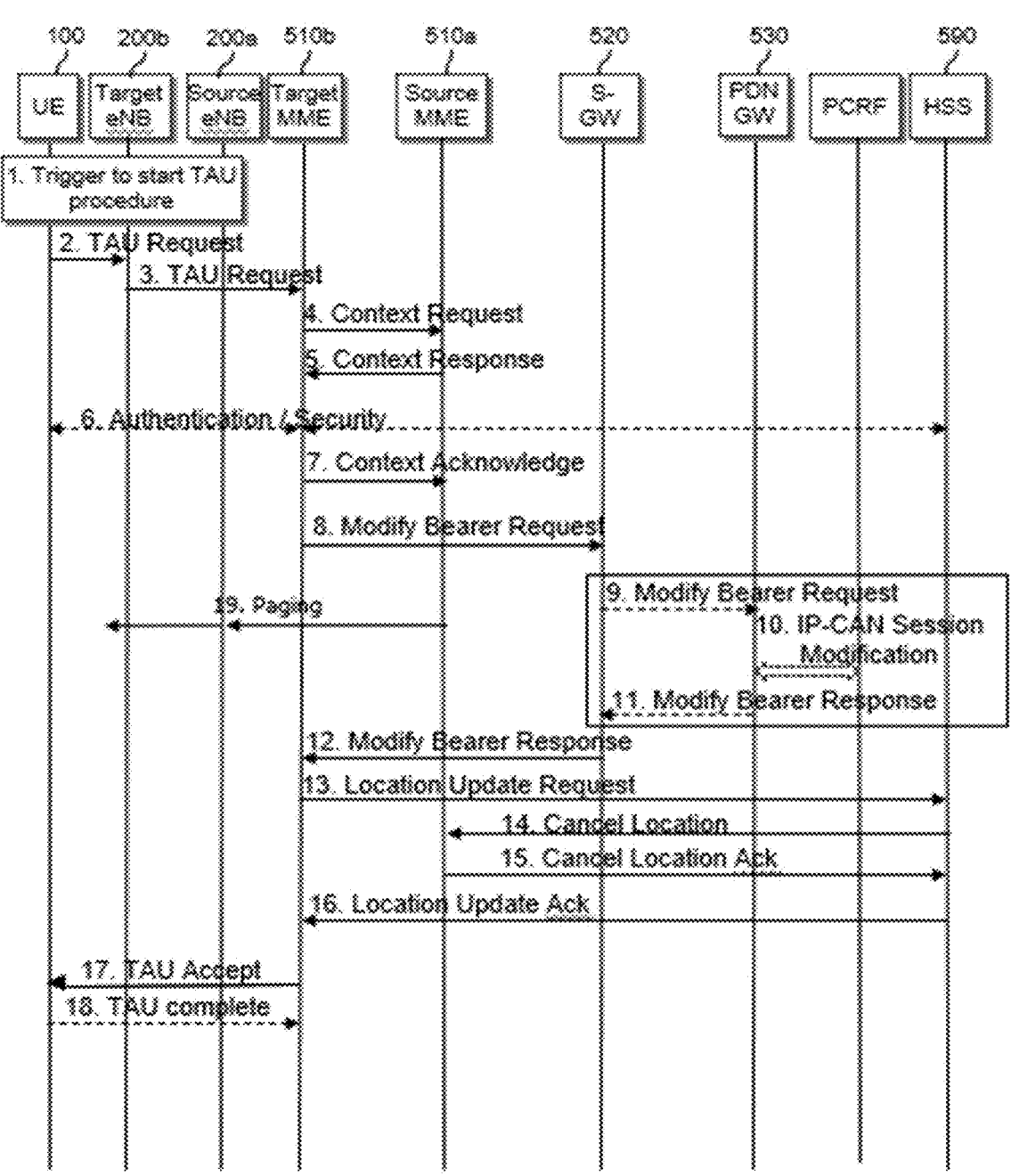
FIG. 7 is an exemplary view illustrating a Tracking Area Update (TAU) procedure.

FIG. 7 shows an exemplary Tracking Area Update (TAU) procedure.

1) In idle mode, the UE 100 moves into the coverage of the target eNodeB 200*b*. Accordingly, a Tracking Area Update (TAU) procedure is determined to start.

2) Then, the UE 100 sends a TAU request message to the target eNodeB 200*b*.

3) Then, the target eNodeB 200*b* determines a responsible MME. In this case, assume, for example, that the target MME 510*b* is determined as a proper responsible MME. The target eNodeB 200*b* transfers the TAU request message to the target MME 510*b*. In this case, assume that the S-GW 520 is not changed.

4-5) Then, the target MME 510*b* sends the UE's context request (e.g., Context Request) to the source MME 510*a*, and in response, receives a context response (e.g., Context Response). This is a process to obtain PDN connection-related information and EPS bearer-related information from the source MME 510*a*.

6) The UE 100 conducts an authentication/security procedure with the target MME 510*b*, and the target MME 510*b* conducts a security procedure with the HSS 590.

7) Meanwhile, the target MME 510*b* transmits to the source MME 510*a* a context acknowledge (e.g., Context Acknowledge) message in response to obtaining the context.

8) Subsequently, the target MME 510*b*, since the S-GW 520 is not changed by the TAU, transmits to the S-GW 520 a bearer modification request message (e.g., Modify Bearer Request), not a session creation request message (e.g., Create Session Request).

9-11) Then, the S-GW 520 transmits a bearer modification request message to the PDN-GW 530 as necessary. The PDN-GW 530 performs an IP-CAN session modification procedure as necessary. The PDN-GW 530 transmits a bearer modification response message (e.g., Modify Bearer Response) to the S-GW 520.

12) Then, the S-GW 520 transmits a bearer modification response message to the target MME 510*b*.

13) Then, the target MME 510*b* transmits to the HSS 590 a location update request message (e.g., Update Location Request).

14-15) Then, the HSS 590 transmits a location cancel message (e.g., Cancel Location) to the source MME 510*a*, and the source MME 510*a* transmits a location cancel acknowledgement message (e.g., Cancel Location Ack) to the HSS 590.

16) Then, the HSS 590 transmits a location update acknowledgement message (e.g., Update Location Ack) to the target MME 510*b*.

17-18) Then, the target MME 510*b* transmits a TAU accept message (e.g., TAU accept) to the UE 100 through the target eNodeB 200*b*, and the UE 100 transmits a TAU complete message (e.g., TAU Complete) to the target MME 510*b* as necessary.

Hereinafter, the following Table 2 to Table 9 show the messages used in each process.

First, the TAU request message may contain one or more pieces of information as shown in Table 2.

TABLE 2

| |
|---|
| Protocol discriminator |
| Security header type |
| Tracking area update request message identity |
| EPS update type |
| NAS key set identifier |
| Old GUTI |
| Non-current native NAS key set identifier |
| GPRS ciphering key sequence number |
| Old P-TMSI signature |
| Additional GUTI |
| NonceUE |
| UE network capability |
| Last visited registered TAI |
| DRX parameter |
| UE radio capability information update needed |
| EPS bearer context status |
| MS network capability |
| Old location area identification |
| TMSI status |
| Mobile station classmark 2 |
| Mobile station classmark 3 |
| Supported Codecs |
| Additional update type |
| Voice domain preference and UE's usage setting |
| Old GUTI type |
| Device properties |
| MS network feature support |
| TMSI based NRI container |

The EPC Update type information element shown in Table 2 above may contain the following bits.

TABLE 3

| EPC Update Type Value |
|---|
| 000: indicates TAU |
| 001: indicates joint update of TAU/LA(Location Area) |
| 010: indicates joint update of TAU/LA (Location Area) together with IMSI attach |
| 011: indicates periodic update |
| 100: unused (if used, interpreted as TAU) |
| 101: unused (if used, interpreted as TAU) |

"Active" flag (octet 1, bit 4)
0: bearer creation not requested
1: bearer creation requested Meanwhile, the above-described context request message may contain the information elements shown in the following Table 4.

TABLE 4

| Information elements | Conditions/descriptions |
| --- | --- |
| IMSI | should be included in case UE successfully authenticated |
| GUTI | A new target MME should include over S10 interface<br>may be included if SRVCC procedure from UTRAN/GERN to E-UTRAN is available |
| Complete TAU request message | a new target MME may include if previous source MME needs it for acknowledgement of no decision |
| RAT Type | indicates what radio access technology is in use |
| Target PLMN ID | if available, may be included for previous MME to determine whether unused authentication vector is to be distributed |
| MME node name | is transferred by a new target MME if the new target MME and associated S-GW both support SR |

Meanwhile, the context response message may contain the information elements shown in the following Table 5.

TABLE 5

| Information element | Conditions/descriptions |
| --- | --- |
| IMSI | IMSI necessarily included except emergency even when UE does not have UICC |
| MME/SGSN UE EPS PDN Connections | Included in case at least one PDN connection is present for UE. |
| SGW node name | Indicates the identifier that has been used to identify S-GW by previous source MME |
| Trace Information | may be included in case session tracking is activated |
| Subscribed RFSP Index | May be included during mobility procedure between MMEs |
| UE Time Zone | Included by source MME |
| MME node name | Transmitted by previous source MME in case previous MME and associated S-GW both support ISR |

The information on the PDN connection in the context response message may contain the information elements shown in the following Table 6.

TABLE 6

| | |
| --- | --- |
| APN Restriction | Indicates limitations on combinations of APN types for APNs related to bearer context. Target MME or SGSN may determine the largest APN limitation using the APN limitations. |
| Linked EPS Bearer ID | Indicates basic bearer of PDN connection |
| PGW node name | may be included in case source MME has the overall name (e.g., FQDN) of PDN GW |
| Bearer Contexts | a number of pieces of information of such type may be included |
| Charging characteristics | May be included in case billing information is offered by HSS to MME |
| Change Reporting Action | May be included whenever available by source MME |

The bearer context information included in the PDN connection information in the context response may contain the information shown in the following Table 7.

TABLE 7

| Information elements | Conditions/descriptions |
| --- | --- |
| PGW S5/S8 IP Address and TEID for user plane | May be included for GTP-based S5/S8 |
| Bearer Level QoS | |
| BSS Container | MME may include packet flow ID, radio priority, SAPI, PS handover XID parameter in TAU/RAU/handover procedure-related message |

TABLE 7-continued

| Information elements | Conditions/descriptions |
|---|---|
| Transaction Identifier | may be transmitted over S3/S10/S16 in case UE supports A/Gb and/or Iu mode |

The TAU accept message may contain the information shown in the following Table 8.

TABLE 8

| Information | Description |
|---|---|
| TAU accept message identifier | message identifier |
| TAU result | indicate result of update, e.g. success or fail |
| T3412 value | timer value for periodic TAU |
| T3402 value | timer starting upon TAU failure |
| T3412 extended value | extended value of T3412 for further lengthening periodic TAU |

In Table 8 above, the T3412 value is a value for allowing the UE 100 to conduct periodic TAU. In order to reduce network load by such periodic TAU, the T3412 extended value is present which allows TAU to be conducted at a longer period. The T3412 extended value may be set up in the MME or may be retained as subscriber information in the HSS 540.

Figure 8:
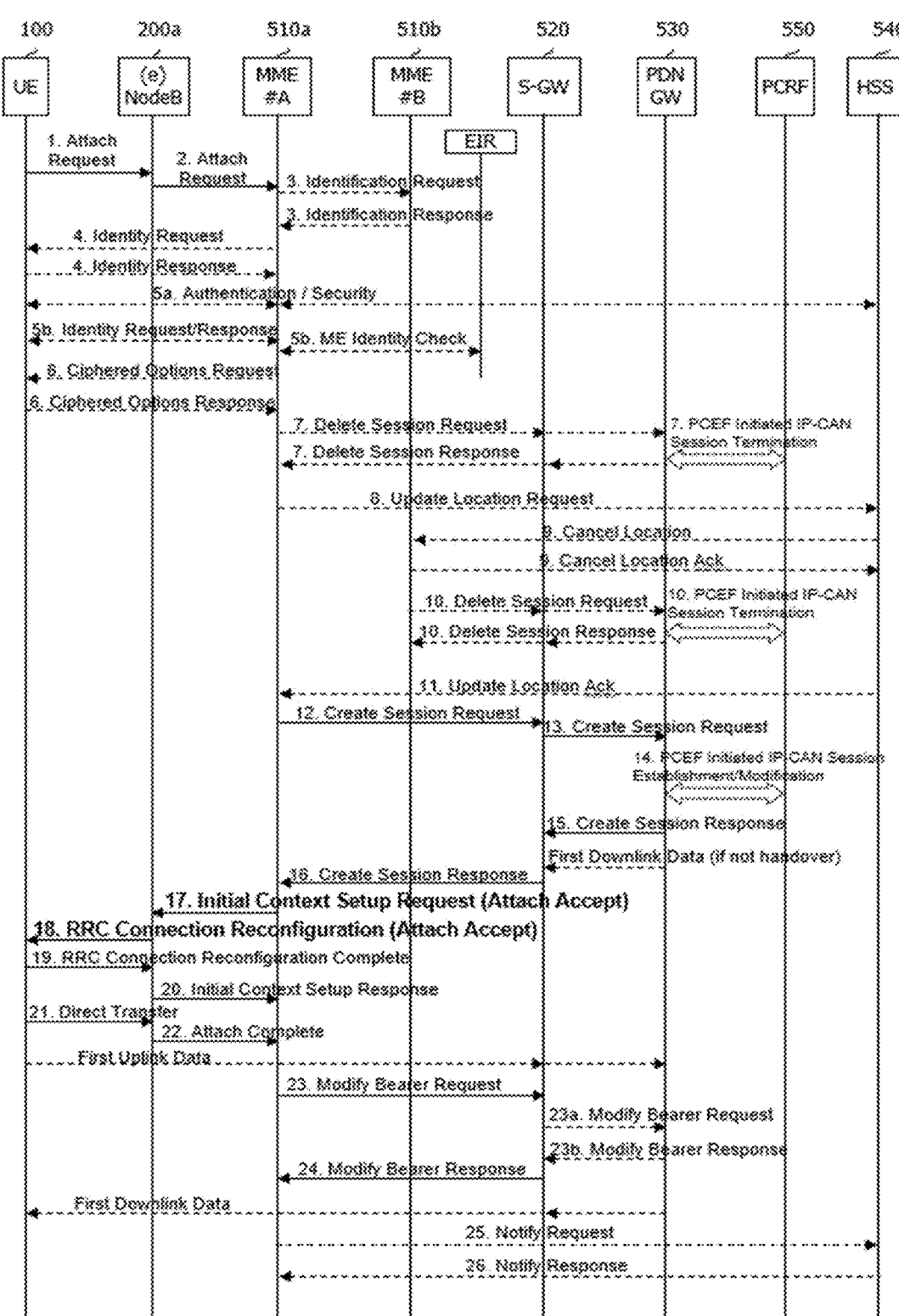
FIG. 8 illustrates a process in which a UE attaches, i.e., connects, to a network.

FIG. 8 illustrates a process in which a UE attaches, i.e., connects, to a network.

1) First, the UE 100 sends (e) an Attach Request message to the NodeB 200*a*.

The attach request message is a message sent by the UE when the UE is powered on or initially performs attach, such as during roaming or handover.

2) The (e) NodeB 200*a* may then receive the attach request message and send the received attach request message to the MME #A 510*a*.

10) The MME #a 510*a* includes an Attach Accept message in an S1-AP based Initial Context Setup message, e.g. an Initial Context Set up Request message, and sends it to the (e) NodeB 200*a*.

The Attach Accept message triggers a radio bearer setup between the (e) NodeB 200*a* and the UE 100.

18-19) The (e) NodeB 200*a* and the UE 100 perform an RRC connection procedure.

20) The (e) NodeB 200*a* sends an Initial Context Setup Response message to the MME #a 510*a*.

22) The (e) NodeB 200*a* sends an Attach Complete message, e.g., Attach Complete, to the MME #A 510*a*. Thus, a tunnel is established between the UE 100 and the S-GW 520. The Attach Complete message includes the TEID of the (e) NodeB 200*a*. As such, the UE 100 may transmit its uplink data to the S-GW 520 via the (e) NodeB 200*a*.

23-24) Meanwhile, the MME #a 510*a* sends a Modify Bearer Request message to the S-GW 520, for example. The modify bearer request message includes the TEID of the (e) NodeB 200*a*. The S-GW 520 sends the Modify Bearer Request message to the P-GW 530, which sends a Response message, e.g., Update Bearer Response message. The S-GW 520 then sends the response message to the MME #a 510*a*. Through this procedure, when the configured bearer is updated, the S-GW 520 transmits downlink data to the UE 100 via the (e) NodeB 200*a*.

THE DISCLOSURE OF THE PRESENT SPECIFICATION

Figure 9:
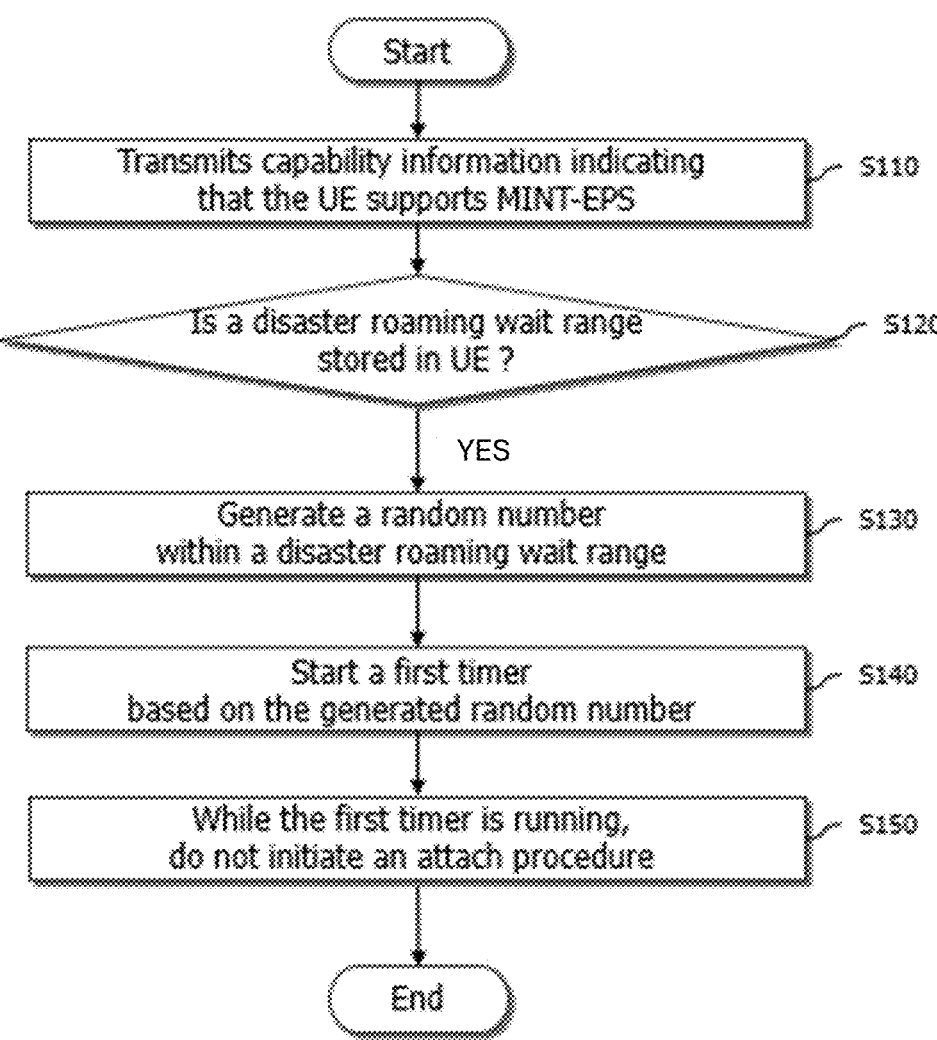
FIG. 9 is an example diagram illustrating a procedure according to one embodiment of this specification.

FIG. 9 is an example diagram illustrating a procedure according to one embodiment of this specification.

Referring to FIG. 9, a UE transmits capability information indicating that the UE supports Minimization of Service Interruption (MINT)-Evolved Packet System (EPS) S110.

After selecting a Public Land Mobile Network (PLMN), the UE determines whether a disaster roaming wait range is stored in the UE S120.

When the disaster roaming wait range is stored in the UE, the UE generates a random number within the disaster roaming wait range S130.

The UE starts a first timer based on the generated random number S140.

While the first timer is running, the UE may not initiate an attach procedure for the selected PLMN, except when the UE needs to request a Packet Data Network (PDN) connection for emergency bearer services S150.

Meanwhile, when the UE supports MINT-EPS and is attached for disaster roaming services in the EPS, and a de-registration procedure is triggered because disaster conditions are no longer applicable at a current location of the UE, the UE may receive a detach request message including a cause value set to "roaming not allowed in this tracking area" and a disaster return wait range.

When the first timer expires and the UE does not have a PDN connection for emergency bearer services, the UE may perform an attach procedure for disaster roaming services if the UE remains camped on the selected PLMN.

When the first timer expires and the UE has a PDN connection for emergency bearer services, if the UE remains camped on the selected PLMN, an attach procedure for disaster roaming services may be performed after releasing the PDN connection for the emergency bearer services.

When the UE supports MINT-EPS, a list of one or more PLMNs to be used in disaster conditions may be stored in a non-volatile memory of the UE so as to be maintained even when the UE enters a deregistered state.

SUMMARY OF THE EMBODIMENTS OF THIS SPECIFICATION

MINT: Minimization of Service Interruption

Attached for disaster roaming services: A UE is considered as "attached for disaster roaming services in EPS" when it has successfully completed attach or tracking area update for disaster roaming services.

Initial attach for disaster roaming services: An attach procedure performed with EPS attach type "disaster roaming attach in EPS" in the ATTACH REQUEST message.

Tracking area update for disaster roaming services: A tracking area update procedure performed with EPS attach type "disaster roaming tracking area updating in EPS" in the ATTACH REQUEST message.

I. MINT-EPS for UE to Obtain Service in EPS Under Disaster Condition

The UE and the network may support MINT-EPS.

If the UE supports MINT-EPS, the indication of whether disaster roaming in EPS is enabled in the UE, the one or more "list of PLMN(s) to be used in disaster condition", if available, are stored in the non-volatile memory in the UE and are kept when the UE enters EMM-DEREGISTERED state. The indication of whether disaster roaming in EPS is enabled in the UE, the one or more "lists of PLMN(s) to be used in disaster condition", stored in the UE are deleted.

If the UE supports MINT-EPS, the UE may indicate this capability to the network during the attach procedure or tracking area updating procedure. Upon selecting a PLMN for disaster roaming in EPS, the UE may perform an attach procedure with the EPS attach type set to "disaster roaming attach", or a tracking area updating procedure with the EPS update type set to "disaster roaming update" for an inter-system change from 5GS to EPS, for disaster roaming services. When the UE is attached for disaster roaming services, the MME may only include TAIs covering the area with the disaster condition.

Upon selecting a PLMN for disaster roaming:

a) if the UE does not have a stored disaster roaming wait range the UE may perform an attach procedure for disaster roaming services on the selected PLMN; and b) if the UE has a stored disaster roaming wait range the UE may generate a random number within the disaster roaming wait range and start a timer with the generated random number. While the timer is running, the UE may not initiate attach on the selected PLMN except if the UE needs to request a PDN connection for emergency bearer services, in which case the UE may initiate the attach procedure, set the EPS attach type IE to "EPS emergency attach" in the ATTACH REQUEST message and keep the timer running. Upon expiration of the timer, if the UE does not have a PDN connection for emergency bearer services, the UE may perform an attach procedure for disaster roaming services if still camped on the selected PLMN. If the UE has a PDN connection for emergency bearer services when the timer expires, the attach procedure for disaster roaming services may be performed after the release of the PDN connection for emergency bearer services, if the UE is still camped on the selected PLMN.

If the UE is switched off when the timer for disaster roaming wait range is running, the UE may behave as follows when the UE is switched on, the USIM in the UE remains the same and the UE selects the PLMN for disaster roaming:

let t1 be the time remaining for the timer for disaster roaming wait range timeout at switch off and let t be the time elapsed between switch off and switch on. If t1 is greater than t, then the timer may be restarted with the value t1-t. If t1 is equal to or less than t, then the timer need not be restarted. If the UE is not capable of determining t, then the UE may restart the timer with the value t1.

Upon expiry of the timer for disaster roaming wait range, the UE may not start a timer with the disaster roaming wait range value again until disaster condition has ended.

Upon determining that a disaster condition has ended:

a) the UE may stop the timer started with a generated random number within the disaster roaming wait range, if running;

b) the UE may perform PLMN selection, except if the UE already selected an allowable PLMN; and c) if the UE selects the UE determined PLMN with disaster condition and has a stored disaster return wait range, which is provided by the PLMN providing disaster roaming services or by the selected PLMN; and the UE may generate a random number within the disaster return wait range, and start a timer with the generated random number value. While the timer is running, the UE may not initiate registration on the selected PLMN except if the UE needs to request an emergency PDU session, in which case the UE may initiate the registration procedure, set the 5GS registration type IE to "emergency registration" in the REGISTRATION REQUEST message and keep the timer running. Upon expiration of the timer, if the UE does not have an emergency PDU session, the UE may perform the registration procedure if still camped on the selected PLMN. If the UE has an emergency PDU session when the timer expires, the registration procedure may be performed after the release of the emergency PDU session, if the UE is still camped on the selected PLMN.

Otherwise, the UE may perform the registration procedure in the selected PLMN.

If the UE is switched off when the timer for disaster return wait range is running, the UE may behave as follows when the UE is switched on, the USIM in the UE remains the same and the UE selects the UE determined PLMN with disaster condition:

let t1 be the time remaining for the timer for disaster return wait range timeout at switch off and let t be the time elapsed between switch off and switch on. If t1 is greater than t, then the timer may be restarted with the value t1-t. If t1 is equal to or less than t, then the timer need not be restarted. If the UE is not capable of determining t, then the UE may restart the timer with the value t1.

Upon expiry of the timer for disaster return wait range, the UE may not start a timer with the disaster return wait range value again until the UE selects a PLMN for disaster roaming services.

When the MME assigns a tracking area to the UE attached for disaster roaming services, the MME may only include TAIs covering the area with the disaster condition.

When the MME determines that the disaster condition has ended and the UE which is attached for disaster roaming services has a PDN connection for emergency bearer services, the MME may initiate the detach procedure to indicate that the UE is attached for emergency services.

If the UE is attached for disaster roaming services and the registered PLMN is removed from forbidden PLMN lists due to reasons, then UE may initiate the detach procedure and perform PLMN selection.

II. Detach Procedure

II-1. Overview

The detach procedure is used:

by the UE to detach for EPS services only;

by the UE to disconnect from the last remaining PDN it is connected to if EMM-REGISTERED without PDN connection is not supported by the UE or the MME;

by the UE in CS/PS mode 1 or CS/PS mode 2 of operation to detach for both EPS services and non-EPS services or for non-EPS services only via a combined detach procedure;

by the network to inform the UE that it is detached for EPS services or non-EPS services or both;

to inform the UE that disaster has ended in the UE determined PLMN with disaster condition, if the UE is attached for disaster roaming for disaster roaming services in EPS II-2. Network Initiated Detach Procedure Initiation If UE supporting MINT-EPS is attached for disaster roaming services in EPS and the network de-registration is triggered due to the disaster condition no longer being applicable in the current location of the UE, the network may set the EMM cause value to #13 "roaming not allowed in this tracking area" and may include a disaster return wait range in the Disaster return wait range IE in the DETACH REQUEST message.

II-3. Network Initiated Detach Procedure Completion by the UE

If the UE receives the Disaster return wait range IE in the DETACH REQUEST message and the UE supports MINT-EPS, the UE may delete the disaster return wait range stored in the ME, if any, and store the disaster return wait range included in the Disaster return wait range IE in the ME.

II-4. Disaster Return Wait Range

This IE may be included to assign a new disaster return wait range to the UE.

III. Tracking Area Updating Procedure

III-1. Normal and Periodic Tracking Area Updating Procedure Initiation

If the UE supports MINT-EPS, the UE may set the MINT-EPS bit to "MINT-EPS supported" in the UE network capability IE of the TRACKING AREA UPDATE REQUEST message.

III-2. Normal and Periodic Tracking Area Updating Procedure not Accepted by the Network If the TRACKING AREA UPDATE REQUEST was triggered by a UE supporting MINT-EPS due to a disaster condition and the disaster condition is no longer being applicable in the current location of the UE, the network may set the EMM cause value to #13 "roaming not allowed in this tracking area" and may include a disaster return wait range in the Disaster return wait range IE in the TRACKING AREA UPDATE REJECT message.

If the UE receives the Disaster return wait range IE in the TRACKING AREA UPDATE REJECT message and the UE supports MINT-EPS, the UE may delete the disaster return wait range stored in the ME, if any, and store the disaster return wait range included in the Disaster return wait range IE in the ME.

If the UE supports MINT-EPS, the MME may include the List of PLMNs to be used in disaster condition IE in the TRACKING AREA UPDATE ACCEPT message.

If the UE supports MINT-EPS, the MME may include the Disaster return wait range IE in the TRACKING AREA UPDATE ACCEPT message.

If the UE supports MINT-EPS, the MME may include the Disaster roaming wait range IE in the TRACKING AREA UPDATE ACCEPT message.

wait timer duration value provided to the UE in the S&F satellite operation parameters IE.

If the UE receives the List of PLMNs to be used in disaster condition IE in the TRACKING AREA UPDATE ACCEPT message and the UE supports MINT-EPS, the UE may delete the "list of PLMN(s) to be used in disaster condition" stored in the UE together with the PLMN ID of the RPLMN, if any, and may store the "list of PLMN(s) to be used in disaster condition" included in the List of PLMNs to be used in disaster condition IE in the UE together with the PLMN ID of the RPLMN.

If the UE receives the Disaster roaming wait range IE in the TRACKING AREA UPDATE ACCEPT message and the UE supports MINT-EPS, the UE may delete the disaster roaming wait range stored in the ME, if any, and store the disaster roaming wait range included in the Disaster roaming wait range IE in the ME.

If the UE receives the Disaster return wait range IE in the TRACKING AREA UPDATE ACCEPT message and the UE supports MINT-EPS, the UE may delete the disaster return wait range stored in the ME, if any, and store the disaster return wait range included in the Disaster return wait range IE in the ME.

III-3. Disaster Return Wait Range

This IE may be included to assign a new disaster roaming wait range to the UE.

III-4 List of PLMNs to be Used in Disaster Condition

This IE may be included by an allowed PLMN to assign a new "list of PLMNs to be used in disaster condition" associated with the serving PLMN to the UE.

IV. Service Request Procedure

IV-1. Service Request Procedure not Accepted by the Network

If the SERVICE REQUEST is triggered for a UE supporting MINT-EPS and attached due to a disaster condition and the disaster condition is no longer being applicable in the current location of the UE, the network may set the EMM cause value to #13 "roaming not allowed in this tracking area" and may include a disaster return wait range in the Disaster return wait range IE in the SERVICE REJECT message.

If the UE receives the Disaster return wait range IE in the SERVICE REJECT message and the UE supports MINT-EPS, the UE may delete the disaster return wait range stored in the ME, if any, and store the disaster return wait range included in the Disaster return wait range IE in the ME.

V. Attach Procedure

V-1. Overview

The attach procedure is used for the following purposes:
  by a UE in PS mode of operation to attach for EPS services only;
  by a UE in CS/PS mode 1 or CS/PS mode 2 of operation to attach for both EPS and non-EPS services;
  by a UE supporting NB-S1 mode only in PS mode of operation to attach for EPS services and "SMS only";
  to attach for emergency bearer services;
  an attach for access to RLOS; or
  the UE has initiated a GPRS attach procedure while in A/Gb mode or Iu mode or an initial registration procedure while in N1 mode and moves to E-UTRAN coverage; or
  a disaster roaming attach.

When the UE supports MINT-EPS and initiates disaster roaming attach, the UE may indicate "disaster roaming attach" in the EPS attach type IE.

V-2 Attach Procedure Initiation

If the UE supports MINT-EPS, the UE may set the MINT-EPS bit to "MINT-EPS supported" in the UE network capability IE of the ATTACH REQUEST message.

If the UE initiates the attach procedure for disaster roaming services, the UE has determined the UE determined PLMN with disaster condition and:

1) the Additional GUTI IE is included in the ATTACH REQUEST message and does not contain a valid GUTI mapped from a 5G-GUTI that was previously assigned by the UE determined PLMN with disaster condition; or

2) the Additional GUTI IE is not included in the ATTACH REQUEST message and the EPS mobile identity IE does not contain a valid GUTI mapped from a 5G-GUTI that was previously assigned by the UE determined PLMN with disaster condition;

the UE may include in the ATTACH REQUEST message the UE determined PLMN with disaster condition IE indicating the UE determined PLMN with disaster condition.

If the UE initiates the attach procedure for disaster roaming services, and the UE determined PLMN with disaster condition cannot be determined when an E-UTRAN cell of the PLMN broadcasts the disaster related indication, the UE does not include in the ATTACH REQUEST message the UE determined PLMN with disaster condition IE but includes the Additional GUTI IE or the EPS mobile identity IE or both.

V-3. Attach Accepted by the Network

If the UE supports MINT-EPS, the MME may include the List of PLMNs to be used in disaster condition IE in the ATTACH ACCEPT message.

If the UE supports MINT-EPS, the MME may include the Disaster roaming wait range IE in the ATTACH ACCEPT message.

If the UE supports MINT-EPS, the MME may include the Disaster return wait range IE in the ATTACH ACCEPT message.

If the UE receives the List of PLMNs to be used in disaster condition IE in the ATTACH ACCEPT message and the UE supports MINT-EPS, the UE may delete the "list of PLMN(s) to be used in disaster condition" stored in the UE together with the PLMN ID of the RPLMN, if any, and may store the "list of PLMN(s) to be used in disaster condition" included in the List of PLMNs to be used in disaster condition IE in the UE together with the PLMN ID of the RPLMN.

If the UE receives the Disaster roaming wait range IE in the ATTACH ACCEPT message and the UE supports MINT-EPS, the UE may delete the disaster roaming wait range stored in the ME, if any, and store the disaster roaming wait range included in the Disaster roaming wait range IE in the ME.

If the UE receives the Disaster return wait range IE in the ATTACH ACCEPT message and the UE supports MINT-EPS, the UE may delete the disaster return wait range stored in the ME, if any, and store the disaster return wait range included in the Disaster return wait range IE in the ME.

If the EPS attach type IE in the ATTACH REQUEST message is set to "disaster roaming attach" and:

a) the UE determined PLMN with disaster condition IE is included in the ATTACH REQUEST message, the MME may determine the PLMN with disaster condition in the UE determined PLMN with disaster condition IE;

b) the UE determined PLMN with disaster condition IE is not included in the ATTACH REQUEST message and the Additional GUTI IE is included in the ATTACH REQUEST message and contains a GUTI mapped from 5G-GUTI of a PLMN of the country of the PLMN providing disaster roaming services, the MME may determine the PLMN with disaster condition in the PLMN identity of the GUTI mapped from 5G-GUTI;

c) the UE determined PLMN with disaster condition IE and the Additional GUTI IE are not included in the ATTACH REQUEST message and the EPS mobile identity IE contains a GUTI mapped from 5G-GUTI of a PLMN of the country of the PLMN providing disaster roaming services, the MME may determine the PLMN with disaster condition in the PLMN identity of the 5G-GUTI; or d) the UE determined PLMN with disaster condition IE is not included in the ATTACH REQUEST message, E-UTRAN of the PLMN providing disaster roaming services broadcasts disaster roaming indication and:

1) the Additional GUTI IE is included in the ATTACH REQUEST message and contains a GUTI mapped from 5G-GUTI of a PLMN of a country other than the country of the PLMN providing disaster roaming services; or 2) the Additional GUTI IE is not included and the EPS mobile identity IE contains a GUTI mapped from 5G-GUTI of a PLMN of a country other than the country of the PLMN providing disaster roaming services;

the MME may determine the PLMN with disaster condition based on the disaster roaming agreement arrangement between mobile network operators.

If the MME determines that the UE can be attached to the PLMN for normal service, the MME may set the EPS attach result value field in the EPS attach result IE to "request for attach for disaster roaming services accepted as attach not for disaster roaming services" in the ATTACH ACCEPT message.

If the UE indicates "EPS disaster roaming attach" in the EPS attach type IE in the ATTACH REQUEST message and the EPS attach result IE value in the ATTACH ACCEPT message is set to "request for attach for disaster roaming service accepted as attach not for disaster roaming service", the UE may consider itself attached for normal service. If the PLMN identity of the attached PLMN is a member of the forbidden PLMN list, any such PLMN identity may be deleted from the corresponding list(s).

V-4. Attach not Accepted by the Network

If the UE initiates the attach procedure for disaster roaming services and the MME determines that it does not support providing disaster roaming services for the UE determined PLMN with disaster condition to the UE, then the MME may send an ATTACH REJECT message with EMM cause #80 "Disaster roaming for the determined PLMN with disaster condition not allowed".

Furthermore, the UE may take the following actions depending on the EMM cause value received in the ATTACH REJECT message.

80 (Disaster roaming for the determined PLMN with disaster condition not allowed).

The UE may abort the initial attach procedure, set the EPS update status to EU2 NOT UPDATED, enter state EMM-DEREGISTERED. PLMN-SEARCH and may delete any GUTI, last visited registered TAI, TAI list and eKSI. Additionally, the UE may reset the attach attempt counter. The UE may not attempt to attach for disaster roaming services on this PLMN for the UE determined PLMN with disaster condition for a period in the range of 12 to 24 hours. The UE may not attempt to attach for disaster roaming services on this PLMN for a period in the range of 3 to 10 minutes. The UE may perform PLMN selection. If the message has been successfully integrity checked by the NAS and the UE maintains the PLMN-specific attempt counter of the PLMN which sent the reject message for the UE determined PLMN with disaster condition, the UE may set the PLMN-specific attempt counter of the PLMN which sent the reject message for the UE determined PLMN with disaster condition to the UE implementation-specific maximum value.

If the UE is operating in single-registration mode, the UE may in addition handle the 5GMM parameters 5GMM state, 5GS update status and registration attempt counter for the case when the initial registration procedure performed over 3GPP access is rejected with the 5GMM cause with the same value.

V-5. UE Determined PLMN with Disaster Condition

The UE may include this IE only if the UE initiates an attach procedure with attach type "disaster roaming attach" when the UE needs to indicate a UE determined PLMN with disaster condition to the network.

Figure 10:
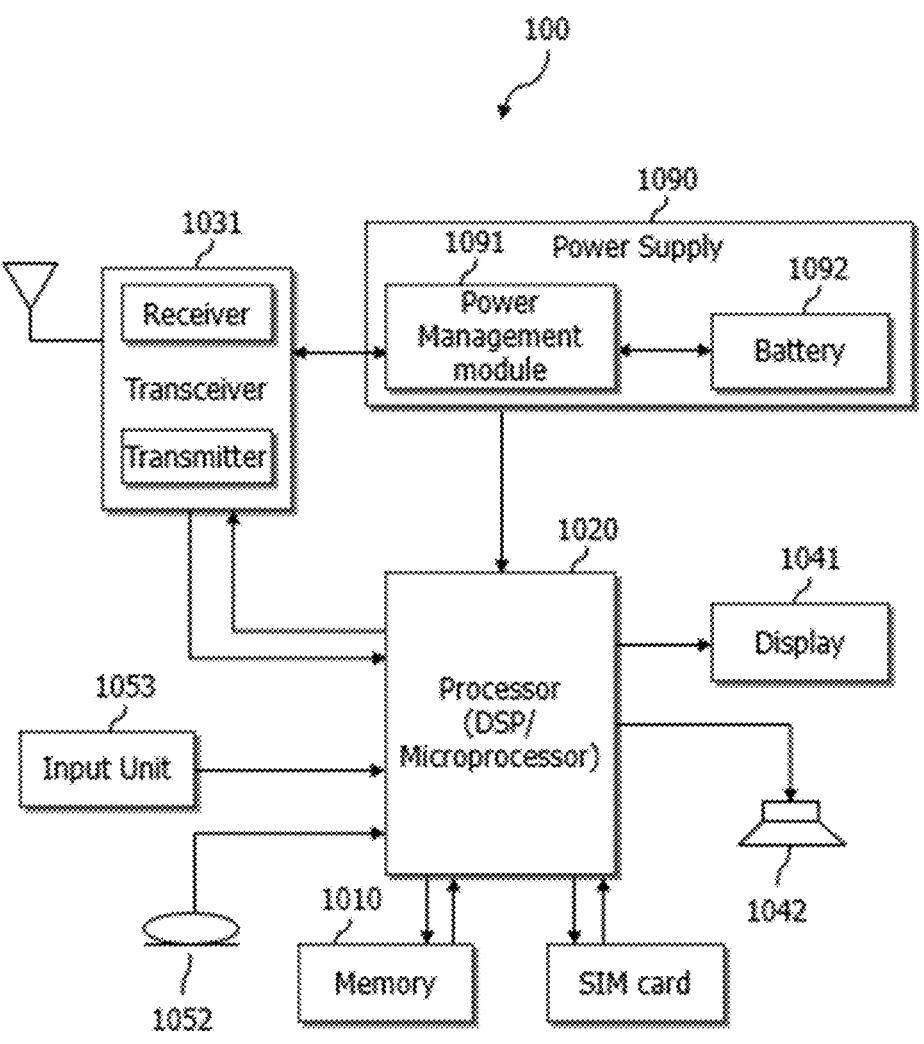
FIG. 10 is a block diagram showing a structure of a UE 100 according to an embodiment.

FIG. 10 is a block diagram showing a structure of a UE 100 according to an embodiment.

A UE 100 includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver.

The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

Figure 11:
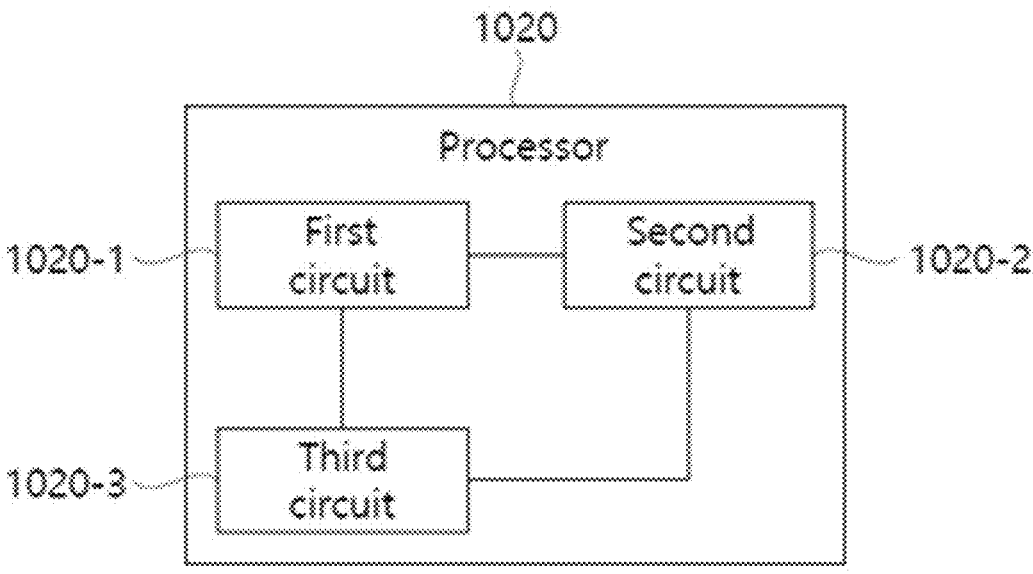
FIG. 11 illustrates a block diagram of a processor in which the present disclosure is implemented.

FIG. 11 illustrates a block diagram of a processor in which the present disclosure is implemented.

As may be seen from FIG. 11, the processor 1020 in which the present disclosure is implemented may include a plurality of circuitry to implement functions, procedures and/or methods described in the present disclosure. For example, the processor 1020 may include a first circuit 1020-1, a second circuit 1020-2, and a third circuit 1020-3. Also, although not shown in the figure, the processor 1020 may include more circuits. Each circuit may include a plurality of transistors.

The first circuit 1020-1 may transmit capability information indicating that MINT (Minimization of Service Interruption)-EPS (Evolved Packet System) is supported.

The second circuit 1020-2 may determine, after selecting a PLMN (Public Land Mobile Network), whether a disaster roaming wait range is stored in the UE.

When the disaster roaming wait range is stored, the third circuit (1020-3) may generate a random number within the disaster roaming wait range.)

A fourth circuit may start a first timer based on the generated random number.

While the first timer is running, a fifth circuit may refrain from initiating an attach procedure for the selected PLMN, except when the UE needs to request a PDN (Packet Data Network) connection for emergency bearer services.

When the UE supports MINT-EPS and is attached for disaster roaming services in the EPS, and a de-registration procedure is triggered because disaster conditions are no longer applicable at a current location of the UE, a sixth circuit may receive a detach request message including a cause value set to "roaming not allowed in this tracking area" and a disaster return wait range.

The processor 1020 may be called Application-Specific Integrated Circuit (ASIC) or Application Processor (AP) and may include at least one of a Digital Signal Processor (DSP), a Central Processing Unit (CPU), and a Graphics Processing Unit (GPU).

The processor may be equipped in the UE.

In the above, preferred embodiments have been described by way of example, but the disclosure of the present specification is not limited to these specific embodiments, and may be modified, changed, or modified in various forms within the scope described in the spirit and claims of the present specification. It can be improved.

In the example system described above, the methods are described on the basis of a flow chart as a series of steps or blocks, but the order of steps described is not limited, and some steps may occur simultaneously or in a different order than other steps as described above. there is. Additionally, those skilled in the art will understand that the steps shown in the flowchart are not exclusive and that other steps may be included or one or more steps in the flowchart may be deleted without affecting the scope of rights.

The claims set forth herein may be combined in various ways. For example, the technical features of the method claims of this specification may be combined to implement a device, and the technical features of the device claims of this specification may be combined to implement a method. Additionally, the technical features of the method claims of this specification and the technical features of the device claims may be combined to implement a device, and technical features of the method claims of this specification and technical features of the device claims may be combined to implement a method.

What is claimed is:

1. An operation method of user equipment (UE), comprising transmitting capability information indicating a support of a minimization of service interruption (MINT)—evolved packet system (EPS);

upon selecting a public land mobile network (PLMN), determining whether the UE has a stored disaster roaming wait range;

when the UE has the stored disaster roaming wait range, generating a random number within the disaster roaming wait range;

starting a first timer based on the generated random number, wherein while the first timer is running, the UE does not initiate an attach procedure on a selected PLMN except when the UE needs to request a packet data network (PDN) connection for emergency bearer services; and when UE supporting the MINT-EPS is attached for disaster roaming services in EPS and when a detach is triggered due to a disaster condition no longer being applicable in a current location of the UE, receiving a detach request message including a cause value set to "roaming not allowed in this tracking area" and a disaster return wait range.

2. The method of claim 1, further comprising:

upon expiration of the first timer, when the UE does not have a PDN connection for emergency bearer services, performing the attach procedure for disaster roaming services if still camped on the selected PLMN.

3. The method of claim 1, wherein when the UE has a PDN connection for emergency bearer services when the first timer expires, the attach procedure for disaster roaming services is performed after a release of the PDN connection for emergency bearer services, when the UE is still camped on the selected PLMN.

4. The method of claim 1, further comprising:

when the UE supports the MINT-EPS, storing one or more "list of PLMN(s) to be used in disaster condition"

in a non-volatile memory of the UE thereby being kept when the UE enters a deregistered state.

5. The method of claim 1, wherein when the UE receives the disaster return wait range in the detach request message and when the UE supports the MINT-EPS, the UE deletes a stored disaster return wait range and store the received disaster return wait range.

6. A user equipment (UE), the UE comprising:

at least one processor; and at least one computer memory operably connectable to the at least one processor and storing instructions that, when executed by the at least one processor, perform operations comprising:

upon selecting a public land mobile network (PLMN), determining whether the UE has a stored disaster roaming wait range;

when the UE has the stored disaster roaming wait range, generating a random number within the disaster roaming wait range;

starting a first timer based on the generated random number, wherein while the first timer is running, the UE does not initiate an attach procedure on a selected PLMN except if the UE needs to request a packet data network (PDN) connection for emergency bearer services; and when UE supporting the MINT-EPS is attached for disaster roaming services in EPS and when a detach is triggered due to a disaster condition no longer being applicable in a current location of the UE, receiving a detach request message including a cause value set to "roaming not allowed in this tracking area" and a disaster return wait range.

7. The UE of claim 6, wherein the operations further include:

upon expiration of the first timer, when the UE does not have a PDN connection for emergency bearer services, performing the attach procedure for disaster roaming services if still camped on the selected PLMN.

8. The UE of claim 6, wherein when the UE has a PDN connection for emergency bearer services when the first timer expires, the attach procedure for disaster roaming services is performed after a release of the PDN connection for emergency bearer services, when the UE is still camped on the selected PLMN.

9. The UE of claim 6, wherein the operations further include:

when the UE supports the MINT-EPS, storing one or more "list of PLMN(s) to be used in disaster condition" in a non-volatile memory of the UE thereby being kept when the UE enters a deregistered state.

10. The UE of claim 6, wherein the operations further include:

when the UE receives the disaster return wait range in the detach request message and when the UE supports the MINT-EPS, the UE deletes a stored disaster return wait range and store the received disaster return wait range.

11. A semiconductor chipset, comprising:

at least one processor; and at least one memory capable of storing instructions and being connected electrically to the at least one processor operably, wherein operations, performed when the instructions are executed by the at least one processor, includes:

upon selecting a public land mobile network (PLMN), determining whether the UE has a stored disaster roaming wait range;

when the UE has the stored disaster roaming wait range, generating a random number within the disaster roaming wait range;

starting a first timer based on the generated random number, wherein while the first timer is running, the UE does not initiate an attach procedure on a selected PLMN except when the UE needs to request a packet data network (PDN) connection for emergency bearer services; and when UE supporting the MINT-EPS is attached for disaster roaming services in EPS and when a detach is triggered due to a disaster condition no longer being applicable in a current location of the UE, receiving a detach request message including a cause value set to "roaming not allowed in this tracking area" and a disaster return wait range.

12. The semiconductor chipset of claim 11, wherein the operations further include:

upon expiration of the first timer, when the UE does not have a PDN connection for emergency bearer services, performing the attach procedure for disaster roaming services if still camped on the selected PLMN.

13. The semiconductor chipset of claim 11, wherein when the UE has a PDN connection for emergency bearer services when the first timer expires, the attach procedure for disaster roaming services is performed after a release of the PDN connection for emergency bearer services, when the UE is still camped on the selected PLMN.

14. The semiconductor chipset of claim 11, wherein the operations further include:

when the UE supports the MINT-EPS, storing one or more "list of PLMN(s) to be used in disaster condition" in a non-volatile memory of the UE thereby being kept when the UE enters a deregistered state.

15. The semiconductor chipset of claim 11, wherein the operations further include:

when the UE receives the disaster return wait range in the detach request message and when the UE supports the MINT-EPS, the UE deletes a stored disaster return wait range and store the received disaster return wait range.

* * * * *